E. A. HORNBOSTEL, Jr.
TROLLEY POLE.
APPLICATION FILED APR. 18, 1906.
1,048,164.
Patented Dec. 24, 1912.
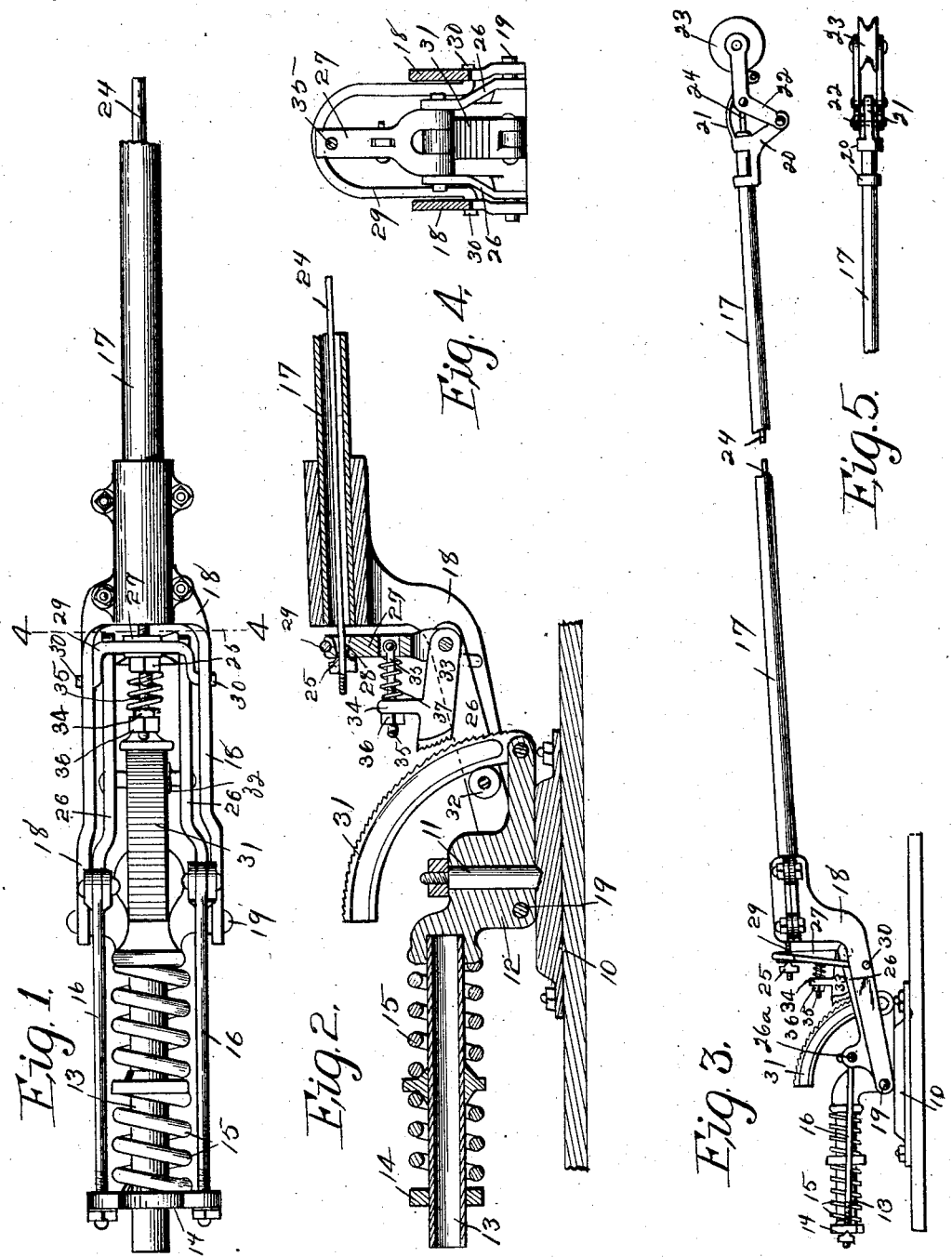

UNITED STATES PATENT OFFICE.

ERNEST A. HORNBOSTEL, JR., OF DES MOINES, IOWA.

TROLLEY-POLE.

1,048,164.   Specification of Letters Patent.   Patented Dec. 24, 1912.

Application filed April 18, 1906. Serial No. 312,360.

*To all whom it may concern:*

Be it known that I, ERNEST A. HORNBOSTEL, Jr., a citizen of the United States, residing at Des Moines, in the county of Polk and State of Iowa, have invented a certain new and useful Trolley-Pole, of which the following is a specification.

The object of my invention is to provide a trolley pole of simple, durable and inexpensive construction so arranged that it may freely move up and down as required to follow a trolley wire and also so arranged that when the trolley wheel leaves the wire, the pole will be instantly and automatically locked against further elevation and the tension of the trolley pole elevating spring be relieved and if when the trolley wheel is off of the wire, the pole should strike a wire and be depressed thereby, it will be automatically retained in its lowered position.

My invention consists in the construction, arrangement and combination of the various parts of the device, whereby the objects contemplated are attained, as hereinafter more fully set forth, pointed out in my claims and illustrated in the accompanying drawings, in which—

Figure 1 shows a plan view of the trolley pole and connected parts, the outer end of the pole being removed. Fig. 2 shows a vertical, longitudinal, sectional view of same. Fig. 3 shows a side elevation of a trolley stand and pole embodying my invention. Fig. 4 shows a transverse, sectional view on the line 4—4 of Fig. 1. Fig. 5 shows a plan view of the rear end of the trolley pole with a trolley wheel therein.

Referring to the accompanying drawings, I have used the reference numeral 10 to indicate the base of the trolley stand on which is the upright 11. Rotatably mounted on the upright 11 is a trolley pole support 12. Projecting forwardly from one end of the trolley support 12 is a tube 13 on which a yoke 14 is slidingly mounted. A spring 15 is provided to engage said yoke and force it forwardly. Two rods 16 are adjustably connected with said yoke by suitable nuts, said rods extending parallel with the tube 13, for purposes hereinafter set forth.

The trolley pole proper is indicated by the numeral 17 and at its forward end are two arms 18 to pass on opposite sides of the support 12 to which they are pivoted at 19. On the outer end of the pole is an arm 20 projecting downwardly and rearwardly and a guard 21 projecting rearwardly. Pivoted to the lower end of the arm 20 is a lever 22 extended upwardly and rearwardly and having the trolley wheel 23 in its outer end. Pivoted to the lever 22 is a rod 24 which extends through the hollow trolley pole to a point beyond its forward end. A lock nut 25 is screwed to the forward end of said rod, for purposes hereinafter made clear.

Pivoted on the pivot pins 19 are two levers 26 to extend rearwardly and upwardly substantially parallel with the arms 18. At the rear end of the arms 26, I have pivoted an upright arm 27 having an opening 28 at its top through which the rod 24 is extended. The nut 25 engages the front face of the upright 27. The numeral 29 indicates a yoke having its ends 30 pivoted to the arms 18 and its central portion extended upwardly and inclined slightly rearwardly and resting in a notch in the top of the upright 27 whereby the intermediate portion of the yoke is supported. Near the forward ends of the levers 26 are the upright arms 26ª to which the rods 16 are pivoted, whereby the force of the spring 15 is applied to elevate the rear ends of the levers 26.

Pivoted to the rear end of the support 12 is a segmental ratchet toothed bar 31 extending upwardly and forwardly and mounted between the arms 26 is a roller 32 to engage the forward under surface of said bar and hold it in position. Mounted at the pivotal point of the upright 27 is a pawl 33 designed to engage the rack 31. The teeth of said pawl are smaller than those of the bar 31 so as to catch and hold on said bar at any point. At the top of the forward end of the pawl is a lug 34 through which a rod 35 is extended. The rear end of this rod is pivoted to the upright 27 and on the forward end thereof is an adjusting nut 36. An extensible coil spring 37 is mounted on the rod to engage the lug 34 and hold it to its forward limit.

In practical use and assuming that the trolley wheel was in engagement with the trolley wire, the force of the spring 15 will tend to hold the rear ends of the levers 26 upwardly so that the arm 27 will stand nearly in line with the yoke 29 and when in this position, the pawl 33 will stand close to, but out of engagement with the rack 31, so that the trolley pole may freely move up and down to follow the trolley wire. However, in the event that the wheel should leave the wire, then the rod 24 will move forwardly a slight distance far enough to permit the pawl 33 to engage the rack 31, whereupon further upward movement of the trolley pole by the spring 15 will be stopped and then if the trolley pole should be pushed downwardly by engagement with a guy wire, the pawl 33 may move downwardly relative to the rack 31 on account of the spring 37 but cannot move farther upwardly and even if the trolley pole should strike the first guy wire which it approaches, it will strike it when standing in a position inclined rearwardly, so that the guy wire will readily press the pole to its lower limit. In this connection it is to be noted that it is very desirable that the pawl 33 engage the rack 31 as quickly as possible after the trolley wheel leaves the wire to prevent upward movement of the pole. For this reason, I have arranged the powerful spring 15 so that its force will be exerted in a direction tending to elevate the rear ends of the levers 26 and also tending to move the upright 27 forwardly and upwardly. The trolley pole is carried by the hanger 29 resting on top of the upright 27 and the trolley wheel itself is held in position by the rod 24 which is connected with the upright 27 by the nut 25. So long as the trolley wheel is in engagement with the trolley wire, it will stand relative to the trolley pole in about the position shown in Fig. 3, because when in that position, the force of the spring 15 as applied to the rod 24 will be counter-balanced by the pressure of the trolley wheel against the wire. As soon, however, as the trolley wheel leaves the wire, the tension on rod 24 is relieved and spring 15 will tend to move the upper end of upright 27 upwardly and forwardly, permitting the pawl 33 to drop into engagement with segment 31. This action of the pawl brings the upright 27 and rod 24 forward, whereupon the shoulders of lever 22 are brought into contact with the end of the pole. The pawl 33 is again disengaged from the rack 31 when the lever 22 that supports the trolley wheel is pulled downwardly by the operator by means of the rope usually provided.

By having the upper end of the upright 27 receiving the intermediate portion of the hanger 29, in the event the trolley wheel should leave the wire the rod 24 will move longitudinally, whereby the upright 27 will swing upon its pivotal support and the pawl 33 will fall into engagement with the rack 31. But by reason of the fact that the upper end of the upright 27 is still in engagement with the hanger 29, the pawl 33 will not be subjected to all of the stress of the spring 15, for the reason that the upper end of the arm 17 will tend to counteract or counterbalance the tension of the said spring 15.

If when the wheel is off the wire the lever that supports it should strike guy wires, said lever may freely move up and down a limited distance without withdrawing the pawl from the rack on account of the spring 37, but by pulling upon the rope usually attached to the lever 22, the pawl may be disengaged from the rack.

Having thus described my invention, what I claim and desire to secure by Letters Patent of the United States, therefor is—

1. A trolley pole structure comprising a support, a pole pivoted thereto, a member pivoted upon said support, an upright pivotally mounted upon said member, a spring mounted upon the support and operating upon the said member, a yoke pivotally mounted upon the pole and engaging the end of the upright, a pawl pivoted upon the member, a lever fulcrumed upon the pole and carrying a wheel, and a rod operatively connecting the lever with the upright.

2. A trolley pole structure comprising a support, a pole pivoted thereto, a member pivoted upon said support, an upright pivotally mounted upon said member, a spring mounted upon the support and operating upon said member, a yoke pivotally mounted upon the pole and engaging the end of the upright, a pawl pivoted upon the member, a spring interposed between the pawl and the upright, a rack bar carried by the support and adapted to be engaged by the pawl, a lever fulcrumed upon the pole and carrying a wheel, and a rod operatively connecting the lever with the upright.

3. A rotatably mounted support, a trolley pole pivoted for vertical movement on said support, an arm pivoted to said support, an upright pivoted to the rear end of the arm, a spring carried by the support and normally holding the rear end of the arm upwardly, a spring actuated pawl connected with said upright, a rack carried by the support to be engaged by the pawl, a yoke connected with the upright extending downwardly and forwardly and pivoted to the trolley pole, a lever fulcrumed to the outer end of the pole, and a rod connecting said lever with said upright.

4. A rotatably mounted support, a trolley pole pivoted for vertical movement on said support, an arm pivoted to said support, an upright pivoted to the rear end of the arm, a spring carried by the support and normally holding the rear end of the arm upwardly, a spring actuated pawl adjustably connected with said upright, a rack carried by the support to be engaged by the pawl, a yoke connected with the upright and extending downwardly and forwardly and pivoted to the pole, a lever fulcrumed at the upper end of the pole, and a rod adjustably connecting said lever and said upright.

5. A trolley support rotatably mounted, an extension at the rear end thereof, a rack pivoted to said extension, a pole pivoted to said support to swing vertically, two arms pivoted to the support and extending rearwardly and upwardly, a roller between the arms to engage the rack, an upright pivoted to the rear ends of said arms, a yoke connected with the top of the upright and extending downwardly and forwardly and pivoted to the pole, a spring actuated pawl adjustably connected with said upright to engage the rack, a lever fulcrumed at the upper end of the pole, and a rod connected to said lever and said upright.

Des Moines, Iowa, March 6, 1906.

ERNEST A. HORNBOSTEL, Jr.

Witnesses:
 JULIA B. SMUTNEY,
 W. R. LANE.

Copies of this patent may be obtained for five cents each, by addressing the "Commissioner of Patents, Washington, D. C."